(12) United States Patent
Tom

(10) Patent No.: US 11,335,343 B2
(45) Date of Patent: May 17, 2022

(54) ADDING AUDIO AND VIDEO CONTEXT TO SMART SPEAKER AND VOICE ASSISTANT INTERACTION

(71) Applicant: Voklize Inc., San Francisco, CA (US)

(72) Inventor: Adam S. Tom, San Francisco, CA (US)

(73) Assignee: Adam Tom, San Francisco, CA (US)

( * ) Notice: Subject to any disclaimer, the term of this patent is extended or adjusted under 35 U.S.C. 154(b) by 167 days.

(21) Appl. No.: 16/839,183

(22) Filed: Apr. 3, 2020

(65) Prior Publication Data

US 2020/0380981 A1     Dec. 3, 2020

Related U.S. Application Data

(60) Provisional application No. 62/854,375, filed on May 30, 2019.

(51) Int. Cl.
*G10L 15/22* (2006.01)
*G10L 25/57* (2013.01)
*G06Q 30/02* (2012.01)

(52) U.S. Cl.
CPC .......... *G10L 15/22* (2013.01); *G06Q 30/0251* (2013.01); *G10L 25/57* (2013.01); *G10L 2015/223* (2013.01); *G10L 2015/228* (2013.01)

(58) Field of Classification Search
CPC ... G10L 2015/0631–0638; G10L 15/22; G10L 15/08; G10L 15/14; G10L 15/18; G10L 15/183; G10L 15/20; G10L 15/26; G10L 2015/221–228
USPC ..... 704/270.1, 270, 275, 276, 231, 251, 255
See application file for complete search history.

(56) References Cited

U.S. PATENT DOCUMENTS

| | | | |
|---|---|---|---|
| 10,123,084 B2 | 11/2018 | Fitzsimmons et al. | |
| 10,306,324 B2 | 5/2019 | Clarke et al. | |
| 2018/0014071 A1* | 1/2018 | Richman | H04N 21/4622 |
| 2018/0343481 A1* | 11/2018 | Loheide | G06Q 30/0242 |
| 2020/0196018 A1* | 6/2020 | Burbank | H04N 21/42203 |

OTHER PUBLICATIONS

Google, LLC; "Google Assistant"; URL:<https://apps.apple.com/us/app/google-assistant/id1220976145> retrieved on Jun. 17, 2020; 3 pages.
AMZN Mobile, LLC; "Amazon Alexa"; URL: <https://apps.apple.com/us/app/amazon-alexa/id944011620> retrieved on Jun. 17, 2020, 3 pages.
Wiefling, Stephan; "Comparison of Audio Watermarking-Techniques"; Master Hauptseminar Medientechnologie WS 15/16; Mar. 2016; 12 pages.

* cited by examiner

*Primary Examiner* — Ql Han
(74) *Attorney, Agent, or Firm* — Lipsitz & McAllister, LLC

(57) ABSTRACT

The present invention provides automated methods, apparatus, and systems for improving engagement with a voice assistant or smart speaker. Media content playback is detected at a media content detection application and the media content is identified. Upon receiving a voice command from a user at a smart speaker or voice assistant relating to the identified media content, the context of the voice command in relation to the identified media content is determined. The voice command is processed and executed based on the determined context.

21 Claims, 1 Drawing Sheet

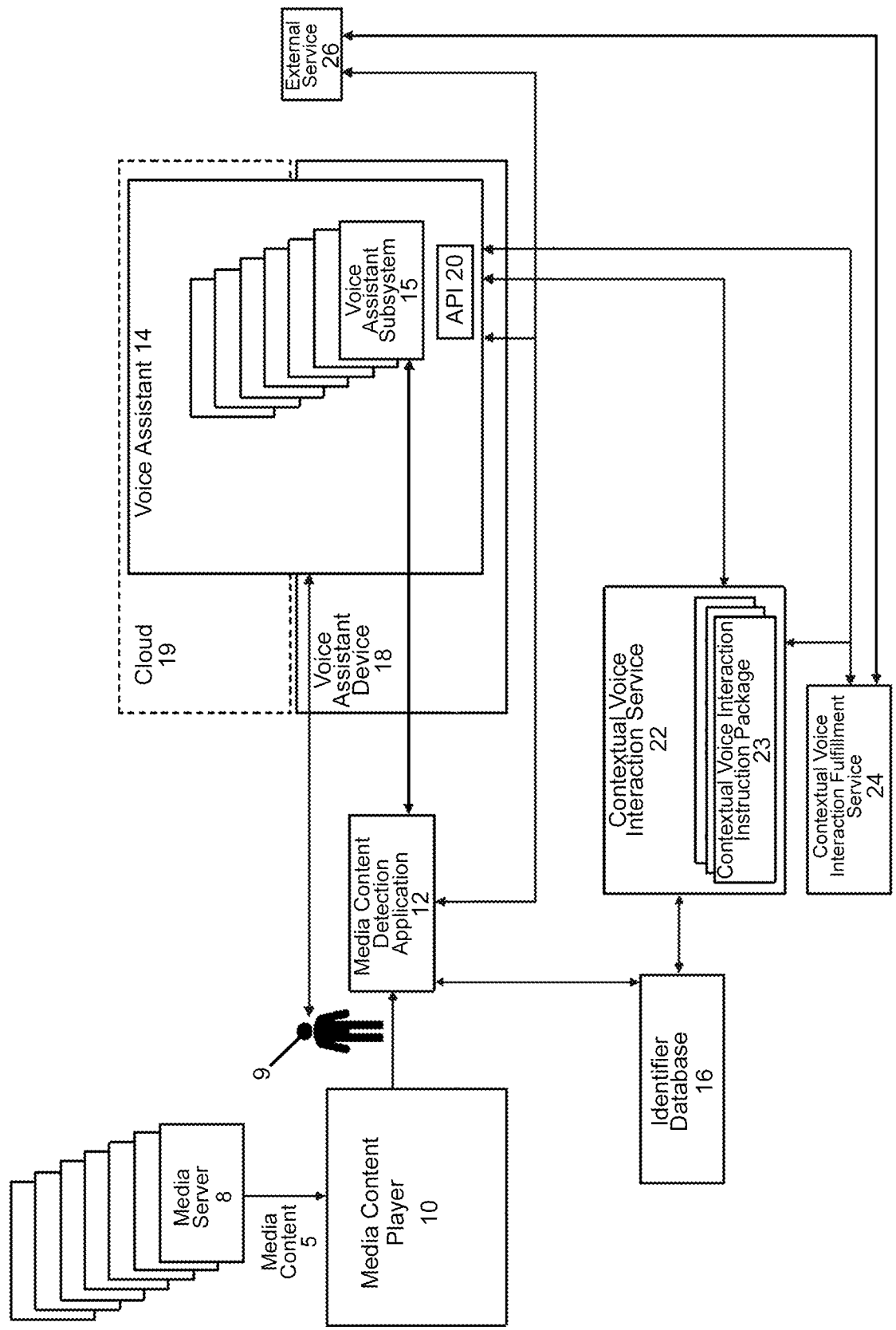

ADDING AUDIO AND VIDEO CONTEXT TO SMART SPEAKER AND VOICE ASSISTANT INTERACTION

This application claims the benefit of U.S. provisional patent application No. 62/854,375 filed on May 30, 2019, which is incorporated herein and made a part hereof by reference.

BACKGROUND OF THE INVENTION

The present invention relates to voice assistants and smart speakers. More specifically, the present invention relates to enhancing user engagement and interaction with voice assistants and smart speakers.

The use of voice assistants, such as Amazon Alexa and Google Assistant, and the ownership of smart speakers with voice assistants, such as the Amazon Echo and Google Home, has dramatically increased over the past few years. Over 100 million people in the U.S. use a voice assistant and nearly 30% of U.S. households own at least one smart speaker. Not only do smart speaker users control their IoT (Internet of Things) devices, listen to music, and set reminders, they also search for and purchase products and services with their smart speakers using a voice assistant.

Because of this high usage and ownership of smart speakers and voice assistants, advertisers, brand owners, and any product or service companies want to have a presence on smart speakers and voice assistants and to create and have interactions with users on these smart speakers and voice assistants. In addition, media companies and content creators want to create interactive experiences for smart speakers and voice assistants. Advertisers, brand owners, media companies, and content creators face challenges, however, in gaining the user's time and attention on smart speakers and voice assistants.

To start with, it is difficult for users to discover voice applications, or voice apps, (such as Alexa Skills and Google Actions) on smart speakers and voice assistants. Voice apps are the means through which users interact with entities (such as advertisers, brands, product and service providers, media companies, and content creators) on smart speakers and voice assistants. These entities create voice apps in the hope that users will enable them and use them on their smart speakers or voice assistants. It is difficult to discover voice apps because voice responses from smart speakers and voice assistants are linear. A smart speaker or voice assistant must speak a list of items one at time. This can take a long time and users typically do not have the patience to listen to a long list. Therefore, a smart speaker or voice assistant usually only provides one item to the user in response to a query from a user. Unless the entity's voice app is the one identified in that response, a user will have a difficult time discovering the particular voice app of an entity. In addition, the creator of the voice assistant (e.g., Amazon or Google) control what the one response is, giving entities very little exposure on smart speakers and voice assistants.

The problem with discovering voice apps on smart speakers and voice assistants equally applies to searching for and finding products and services. When a user initiates a voice search with a smart speaker or voice assistant, they usually only get one item in the response from the smart speaker or voice assistant. This makes it very difficult for products and services from different entities to be found on smart speakers or voice assistants.

Because it is difficult for users to discover voice apps, the number of installations of voice apps is low. As of early 2019, with nearly 60,000 voice apps available on the Amazon Echo and Amazon Alexa, only 35% of users had enabled a third-party voice app. Not only are installation rates low, but user engagement and retention are low. Only 3% of users use a voice app that they have installed 2 weeks after they installed it. Another indication of low usage is the number of voice apps that have user ratings. As much as 60% of Amazon Alexa voice apps have no ratings and 17% only have one rating.

To make matters worse, in order to interact with a smart speaker or voice assistant, a user must use specific wording and specific syntax in their spoken commands to activate the smart speaker or voice assistant or to activate capabilities of the smart speaker or voice assistant. Sometimes the wording can be long, and if the user's command does not adhere to the exact words, order of words, or structure of words, the smart speaker or voice assistant will not understand what the user wants to do nor the intent of the user. Presently, there is also no easy or obvious way for a user to discover what the wording or syntax should be.

The result is that even though advertisers, brand owners, media companies, content creators, and product and service providers have a strong desire to have engaging interactions and high usage and awareness with users on smart speakers and voice assistants, they do not. Engagement and interaction with these entities is low, and opportunities for advertisers, brand owners, media companies, content creators, and product and service providers are lost.

At the same time, the U.S. population spends a large part of their day and attention watching television and digital video and listening to radio and digital audio. U.S. adults spend over 5 hours per day watching television and digital video and 2.5 hours per day of listening to radio and digital audio. Television and digital video advertising garners the largest portion of advertising spending in the U.S., and U.S. television and digital video advertising is projected to grow from $97 B in 2018 to $119 B in 2022. Television and digital video advertising continue to be the best means to achieve broad reach and positive brand recognition for advertisers and brand owners and continues to have a big influence in each step of the purchase funnel. Concurrent with this growth, media companies are looking to re-energize, and add value to their television, digital video, radio and digital audio programs and ads.

Therefore, because of the high growth, scale, and usage of smart speakers and voice assistants, because advertisers, brand owners, product and service providers, media companies, and content creators are seeking and need strategies for gaining presence in voice assistants, because people consume a large amount of television, digital video, radio, and digital audio, because television and digital video advertising is still the best medium for broad reach and brand awareness, and because media companies want to re-energize and add value to their video and audio programs and ads, there is a need and opportunity to use the attention-garnering power of audio and video programming and advertising to prompt and drive interaction on smart speakers and voice assistants to provide brands, advertisers, media companies, and content creators a powerful voice strategy and presence on smart speakers and voice assistants while making television, radio, and digital video and audio more valuable.

The present invention satisfies these needs and provides other advantages.

SUMMARY OF THE INVENTION

The present invention relates to methods and apparatus to link the identity and knowledge of the content of an audio or video program or ad (which includes a portion or portions of a program or ad) to user interaction with a voice assistant and/or smart speaker and add context to the interaction and the processing of the interaction.

In one example embodiment of the present invention, an automated method for improving engagement with a voice assistant or smart speaker is provided. The method may comprise detecting media content playback at a media content detection application, and identifying the media content. Upon receiving a voice command from a user at a smart speaker or voice assistant relating to the identified media content, the method may further comprise determining context of the voice command in relation to the identified media content, processing the voice command based on the determined context, and executing the voice command based on the determined context.

The method may further comprise detecting an identifier within the media content via the media content detection application. In such an embodiment, the identifying of the media content may comprise locating the detected identifier in an identifier database and retrieving associated identifying information for the media content. The identifying information may be provided to the voice assistant or one or more voice assistant subsystems for use in at least one of the determining of the context of the voice command and the processing of the voice command. The identifying information is provided to the voice assistant and/or to the one or more voice assistant subsystems at least one of before the receiving of the voice command, subsequent to the receiving of the voice command, and at multiple times either before or after the receiving of the voice command.

The media content detection application processes the identifying information and adds the processed output to the identifying information or a portion of the identifying information that is provided to the voice assistant or the one or more voice assistant subsystems.

The identifier may comprise one of a string of characters embedded in the media content, a watermark embedded in the media content, or a fingerprint of the media content. As an example, an Ad-ID system can be used for creating the identifier for advertisements, and an EIDR system can be used for creating the identifier for video programs.

The identifying information may comprise at least one of: a title or identity of the media content; a unique identifier for the media content; a description of the media content; a transmission channel or source of the media content; metadata for the media content; instructions or information associated with the media content required by the media content detection application or the voice assistant for carrying out associated functions related to the media content or the voice command; and programs or applications related to the media content, or the like.

At least one of the voice assistant, the media content detection service, and a contextual interaction service that enables at least one of processing the voice command and communicating with the user is one of hardware-based, cloud-based, or both hardware and cloud-based.

The identifying of the media content may be carried out using one of an automated content recognition (ACR) application or audio watermarking.

The media content may comprise at least one of an audio or video program, a portion of an audio or video program, an audio or video advertisement, or a portion of an audio or video advertisement.

The media content is provided by a media content playback device. The media content playback device may comprise a stand-alone device, a television, a smart TV, a radio, a streaming media device, a digital assistant device, a set top box, a speaker, a smart speaker, a mobile phone, a tablet, a laptop computer, a home audio system, headphones or earphones with an associated microphone, electronic signage, or the like.

The media content detection application and the voice assistant may be integrated in a single device or in separate devices.

The method may further comprise providing a contextual voice interaction service in communication with the voice assistant for at least one of determining the context of the voice command, the processing of the voice command, and communicating with the user. The contextual voice interaction service may be enabled to at least one of create and populate an identifier database which associates the identifier with identifying information for the media content.

At least one of the voice assistant, the one or more voice assistant subsystems or the contextual voice interaction service may be enabled to take actions without first receiving the voice command or to take actions that are independent of the voice command. The actions may comprise at least one of interpreting intent of possible voice commands, formulating responses prior to receiving a possible voice command, launching an application relating to the media content in anticipation of a possible voice command, or the like.

The identifying information may be used or processed by at least one of the voice assistant, the contextual voice interaction service, or the one or more voice assistant subsystems to at least one of: interpret an intent of the voice command; determine what actions to take in response to the voice command; launch one of the one or more voice assistant subsystems; determine which voice application or voice assistant subsystem to install or launch; install a voice application related to the media content; launch a voice application related to the media content; determine which voice application or voice assistant subsystem to forward the voice command to; determine which part of a voice application or voice assistant subsystem to execute; execute a certain part of a voice application or voice assistant subsystem; discover voice applications in the voice assistant; enable simplified word phrasing and syntax of the voice command needed to perform a desired function; enable understanding of a reduced number of words in the voice command needed in order to perform a desired function; perform a search related to the voice command or to the identifying information or portion thereof; retrieve additional information related to the media content from an external service and use the additional information in subsequent processing; retrieve instructions related to the media content and use the instructions in subsequent processing; formulate a response to the voice command by determining words of an audio response, the text of an SMS message to a user's mobile phone, or a graphic that will appear on a user's electronic device; determine and formulate a form of a response to the voice command including at least one of audio, video, text, or graphics; determine one or more devices through which the user will receive one or more responses to the voice command; fulfill an action specified by a voice application or by the retrieved instructions related to the media content, or the like.

The one or more devices comprise a smart speaker, a mobile phone, a smart television, a home audio system, an automobile audio or navigation system, a tablet computer, an internet enabled device, or the like.

The contextual voice interaction service may comprise a plurality of contextual voice interaction instruction packages, each of the instruction packages being associated with corresponding media content via the identifying information for the corresponding media content and containing instructions for responding to possible voice commands and/or follow-on voice commands related to the corresponding media content.

The method may further comprise at least one of adding additional instruction packages to the contextual voice interaction service or updating the instruction packages.

The method may further comprise providing a contextual voice interaction fulfillment service associated with at least one of the voice assistant and the contextual voice interaction service enabled to fulfill any action requested as a result of processing the voice command.

The fulfillment service may be in communication with external services for the fulfillment of the requested action.

The identifying of the media content may occur one of prior to the receiving of the voice command or upon receipt of the voice command.

The voice command may comprise one of a verbal request for action, a statement, a question, or a response to the smart speaker or voice assistant.

In a further example embodiment of an automated method for improving engagement with a voice assistant or smart speaker, the method may comprise detecting media content playback at a media content detection application, identifying the media content via the media content detection application, and locating instructions relating to the identified media content via the media content detection application. The located instructions are then provided to a voice assistant or one or more voice assistant subsystem. The actions are then carried out in accordance with the located instructions by the voice assistant or the voice assistant subsystem. The foregoing takes place without first receiving a voice command.

The actions may comprise at least one of interpreting intent of possible voice commands, determining what actions to take for a user, formulating voice responses prior to receiving a possible voice command, initiating a dialog with a user relating to the media content, launching an application relating to the media content, launching one of the one or more voice assistant subsystems; determining which voice application or voice assistant subsystem to install or launch; installing a voice application related to the media content; launching a voice application related to the media content; determining which part of a voice application or voice assistant subsystem to execute; executing a certain part of a voice application or voice assistant subsystem; discovering voice applications in the voice assistant; retrieving additional information related to the media content from an external service and use the additional information in subsequent processing; fulfilling an action specified by a voice application or by the retrieved instructions related to the media content.

The present invention also encompasses an automated system for improving engagement with a voice assistant or smart speaker. In one example embodiment, such a system may comprise a media content playback device for playback of media content, a media content detection application for detecting media content playback. The media content detection application being adapted for identifying the media content by detecting an identifier within the media content, locating the detected identifier in an identifier database, and retrieving associated identifying information for the media content. A smart speaker or voice assistant may be provided for receiving a voice command from a user relating to the identified media content. A contextual voice interaction service may be provided for determining a context of the voice command in relation to the identified media content. The identifying information may be provided to the voice assistant or one or more voice assistant subsystems for use in at least one of the determining of the context of the voice command and the processing of the voice command. The smart speaker or voice assistant processes and executes the voice command based on the determined context.

The automated system may include and/or carry out the various features and functionality of the example method embodiments discussed above.

BRIEF DESCRIPTION OF THE DRAWING

The present invention will hereinafter be described in conjunction with the appended drawing FIGURE:

FIG. 1 shows an example embodiment of a system for adding audio and video context to smart speaker and voice assistant interaction in accordance with the present invention.

DETAILED DESCRIPTION OF THE INVENTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

The present invention relates to methods and apparatus to link the identity and knowledge of the content of an audio or video program or ad (or a portion or portions of a program or ad) to user interaction with a voice assistant and/or smart speaker and add context to the interaction and the processing of the interaction.

It should be appreciated that, as used in the description below and the claims, the term "command" or "voice command" may take the form of a verbal request for action, a statement, a question, a response to the smart speaker or voice assistant, or any other verbal utterance from a user that is received by the smart speaker or voice assistant.

It should also be appreciated that, as used in the description below and in the claims, the term "media content" and "media content program" and "program" are used to denote any type of media and content, including but not limited to video content, audio content, a video program, a television program, an audio program, a radio program, an advertisement, an audio advertisement, a radio advertisement, a television advertisement, or a video advertisement, or any portion or part of any of the foregoing.

In an example of the use of the invention, a user is watching a television program and an ad plays during the program. The advertisement is for a new Wendy's hamburger. The user speaks the command, "Order me one and deliver by Grubhub" to a voice assistant through a smart speaker that is present in the same room as the user. While the ad is playing, the voice assistant is detecting that an ad is playing and identifies the ad and the content of the ad. The detection can happen before, during, or after the user speaks the above command. When the user speaks the above command, the voice assistant therefore knows or will determine what the user is referring to, and the voice assistant knows or will know the audio and video context in which the user has spoken the command.

The voice assistant then uses the knowledge of the identity and content of the ad to process the user command. When processing the user command, the voice assistant uses this knowledge and enables and/or executes the Wendy's voice app (or other appropriate voice app), and sends the user command, the identity and associated data of the ad to the Wendy's voice app. With this information, the voice app then requests a set of interaction instructions and more information about the ad or it can determine which part of a voice app to execute and proceed to execute it. The voice app then follows the instructions when formulating and delivering a response to the user.

By following or processing the set of interaction instructions, the voice app responds to the user through the smart speaker with, for example, the phrase, "Would you like me to order you a Biggie Bag and deliver it to you using Grubhub at 123 Main Street?" The user responds with, "Yes." The voice app then interfaces with Wendy's and Grubhub's cloud services to fulfill the order and responds to the user with the phrase, "Your order will be $6.95 and will arrive in 15 minutes. Would you like to complete your order?" The user replies, "Yes," and the voice app interfaces with the Wendy's and Grubhub's cloud services to complete the order and initiate the delivery of the order. The voice app replies to the user with, "Your order is complete."

In an alternative use of the invention for the above example, instead of enabling and/or executing a voice app after a user has spoken a voice command, the system can launch a voice app before a user has spoken a voice command. For example, a user is watching a television advertisement for a new Wendy's hamburger and while the advertisement is playing but before a user speaks a command, the voice assistant detects that an ad is playing and identifies the ad and the content of the ad. The voice assistant then uses this knowledge and enables and/or executes a voice app specific to the advertised Wendy's hamburger (or some other appropriate voice app). Then, when a user speaks the command, "Order me one", the voice assistant sends the user command to the voice app and the voice app orders the right hamburger for the user because the voice app is specific to that ad. Of course, the voice assistant can also send the identity and associated data of the ad along with the voice command to the voice app, and with this information, the voice app can request a set of interaction instructions and more information about the ad or it can determine which part of a voice app to execute and execute it. The voice app can then follow the instructions when formulating and delivering a response to the user.

In another example embodiment of the present invention, a new type of interactive audio or video programming experience is created where a user, while they are watching or listening to media content program, can speak commands or questions related to the media content to a voice assistant at various points during the playing of the media content. By identifying different portions of the media content, the voice assistant responds to or interacts with the user accordingly with relevant responses or phrases by following or processing sets of interaction instructions pertaining to the different points or portions of the media content. In this example, the voice assistant continually detects and identifies multiple portions of the media content being played. When a user speaks commands throughout the media content program, because the voice assistant knows during which portions of the program the commands are spoken and has identified the portions of the program, the voice assistant and the voice app for the program know the context in which the commands are spoken and can respond or interact accordingly.

As an example, a user is watching a video program about math, and the narrator asks the audience to find the sum of two numbers and to say it out loud. Because the voice assistant can identify portions of a program, and then enable voice apps which contain or can then access further information and sets of interaction instructions pertaining to the identity of different portions of a program, the voice assistant and relevant voice app can know that in this portion of the program the narrator has asked the audience to respond with an answer and also knows what the answer should be. When the user speaks the correct answer to the voice assistant through a smart speaker, the voice app can then respond with, for example, "You are right. Great Job!" This type of interaction and other types of interactions can happen at any point and at many times during an audio or video program.

Note that the above interactions and means of access to a voice assistant can be accomplished with devices other than a smart speaker. For example, they can be accomplished with a mobile phone, streaming media box, set top box, smart TV, or other Internet enabled device.

In yet another example, a user is listening to an audio podcast through their earphones connected to their mobile phone, which includes a voice assistant. The earphones contain a microphone. The topic of the podcast is a popular music group. During the podcast, the group's next concert is discussed. During this portion of the program, the user says, "Tell me more" to a voice assistant in the mobile phone through the earphone's microphone. Again, because the voice assistant can identify portions of a program, and then enable voice apps which contain or can then access further information and sets of interaction instructions pertaining to the identity of different portions of a program, the voice assistant and relevant voice app can know that this portion of the program pertains to the group's next concert.

The voice app then responds to the user's command by sending information about the group's next concert in the user's geographic area to the podcast app on the user's mobile phone in the form of a notification. The voice app also responds to the user through their earphones with the phrase, "Please check your mobile phone for more information on the next concert. Would you like to order tickets?" The user then responds with, "I'd like to order two tickets". The voice app then interfaces with Ticketmaster and sends another notification to the podcast app on the user's mobile phone with a link to seat selection on the Ticketmaster website. The voice app then responds to the user through their earphones with, "Please tap the link to select and purchase your seats. Thank you and hope you enjoy the show!"

FIG. 1 shows a block diagram of an example embodiment of the present invention. The following describes example features and capabilities of the invention in connection with the FIG. 1 embodiment.

The present invention enables detection of the identity of the media content being played on an electronic device. The electronic device can be any type of device capable of playing audio or video content, including but not limited to a television, a set top television box, a smart speaker, a radio, a computer, a tablet computer, a mobile phone, a smart watch, or any Internet enabled device or the like.

A media content program can contain any type of audio or video content. For example, audio or video content can be a television or radio advertisement; a video, audio, or image advertisement; a song; a documentary; a movie; a television show; a podcast; a radio channel; a television channel; or a series or sequence of the aforementioned.

Media content 5 may be provided by one or more media servers 8. The media content 5 is received and decoded, and/or played out by a Media Content Player 10 (such as a television, a smart TV, radio, a streaming media box, a digital assistant device, a set top box, a speaker, a smart speaker, a mobile phone, a tablet computer, a laptop computer, a home audio system, headphones or earphones with an associated microphone, electronic signage with a speaker, or any device with a video display or audio speaker).

A Media Content Detection Application 12 detects the identity of the media content program (which includes a whole program, a portion of a program, or portions of a program) or the content therein while the media content program is decoded or played out by the Media Content Player 10. The Media Content Detection Application 12 can detect a whole program, a portion of a program or one or more portions of a program and can do so on a solitary or continual basis.

The Media Content Detection Application 12 may be included within the Media Content Player 10, or may be provided separately as shown in FIG. 1 (such as within a streaming media box, set top box, speaker, smart speaker, mobile phone, tablet, laptop computer, remote control, audio system, a dedicated separate device, or any other electronic device). The Media Content Detection Application 12 may alternatively be included in the Voice Assistant Device 18 or in the same device as the Voice Assistant 14 (to be discussed below), in the Cloud 19, or implemented partially in the Cloud 19 and partially in a hardware device. Note in some cases (e.g., for devices with speakers only) the detection application 12 may reside in a user's smart phone or other device with a microphone.

If the Media Content Detection Application 12 is in a separate device from the Media Content Player 10, it is assumed that the devices are in the same room, are in adjacent rooms, or are in close proximity to each other, or remote from one another but in communication with each other via a wired or wireless connection.

Detection of the identity of a program or portion of a program by Media Content Detection Application 12 can be accomplished by a plurality of methods. Two established examples of methods of detecting the identity of a program are Automatic Content Recognition (ACR) and Audio Watermarking. If the Media Content Detection Application 12 is in the Media Content Player 10, detection of the identity of a program can also be accomplished by processing any metadata that is contained in, part of, sent along with, or associated with the Media Content program.

The identity of a program can be also be provided in other ways. For example, the identity can be in the form of a unique identifier composed of, for example, a string of characters embedded in the media content, in the form of a string of text containing the title of the audio or video content or of the program, or in the form of a fingerprint of the program. All these forms of identifying a program are called program identifiers and there are established methods of creating, storing, and tracking program identifiers that can be used. For example, the Ad-ID system can be used for creating a unique identifier for advertisements, and the EIDR (Entertainment Identifier Registry) system can be used for creating a unique identifier for video programs.

Automatic Content Recognition (ACR) techniques can also be used to identify media content. With Automatic Content Recognition, an audio or video program is first processed (typically offline) and a fingerprint of the program is created. This fingerprint is then stored in a database, e.g., the Identifier Database 16, along with program-related information, denoted as Identifying Information.

When media content 5 is transmitted to the Media Content Player 10 for decoding and/or playout, listening, or viewing by a user 9, the Media Content Detection Application 12 accesses the program. The Media Content Detection Application 12 can access the program, for example, directly from the decoder of the Media Content Player 10, the audio or video frame buffer of the Media Content Player 10, by a microphone or camera exterior to the Media Content Player 10, or by other means.

Once the Media Content Detection Application 12 accesses the program, it processes the program (typically in real time as the program is presented to the user 9) and creates a fingerprint of the program.

The Media Content Detection Application 12 then compares this fingerprint to the database of stored fingerprints in the Identifier Database 16. When a match is found, the Media Content Detection Application 12 retrieves the Identifying Information or portion thereof of the program and may also undertake some processing of the Identifying Information or portion thereof.

Audio Watermarking may also be used to identify media content. In the case of Audio Watermarking, a unique identifier (typically in the form of a string of characters) is first created for the media content program. This unique identifier is stored in the Identifier Database 16 along with Identifying Information for the program. The unique identifier is then embedded into the essence of the program by one or more Audio Watermarking methods. An example of an Audio Watermarking method is the SMPTE Open Binding of Content Identifiers (OBID) standard SMPTE ST 2112-10:2018.

Where audio watermarking is used for identification, once the Media Content Detection Application 12 accesses the program, it processes the audio portion of the program according to the chosen Audio Watermarking method to detect the unique identifier. The process to detect the unique identifier can occur within the Media Content Player 10 at the point the audio stream is decoded or played out. The process to detect the unique identifier can also occur outside of the Media Content Player 10 after the decoded audio stream has been played out over an audio speaker in the Media Content Player 10, transmitted over an acoustic channel, and received by a microphone that is connected to an Media Content Detection Application 12.

When a unique identifier is detected in an audio or video program, the Media Content Detection Application 12 then looks up the identifier in the Identifier Database 16 and retrieves the Identifying Information or portion thereof of the program and may also undertake some processing of the Identifying Information or portion thereof.

As discussed above, an identifier obtained from the media content program can be used to look up and retrieve Identifying Information in the Identifier Database. When the Media Content Detection Application 12 detects an identifier (for example, a fingerprint when using ACR or a unique identifier when using audio watermarking) in a program, the Media Content Detection Application Service 12 looks up the identifier in the Identifier Database 16 and retrieves the Identifying Information or portion thereof associated with the identifier. The Identifier Database 16 is a database that associates identifiers to Identifying Information related to those identifiers for particular media content. Identifying Information is information that is related to a media content program and/or the identifier of a program. Identifying Information may include but is not limited to: the title or identity of a program; a unique identifier for a program, other identifier for a program, a description of a program, the transmission channel or source of a program, any other information or metadata related to a program, including but not limited to date of creation, source, owner, creator, author, format, file size, keywords, ISBN or other identifiers, and other types of information or metadata.

The identifying information may also include any instructions that the Media Content Detection Application 12 might need to perform its functions related to that program and/or its identifier, any information related to a program or application that can be used by the Voice Assistant 14 or Voice Assistant Subsystems 15 to perform their functions, and any other information related to the media content or services, commands, actions or functions relating thereto, or any combination of the above.

A Contextual Voice Interaction Service 22 may be used to create and populate the Identifier Database 16. The Contextual Voice Interaction Service 22 may be used to associate an identifier to Identifying Information. The Contextual Voice Interaction Service 22 may be used to create the Identifying Information for a program and/or an identifier for a program.

After the Media Content Detection Application 12 retrieves the Identifying Information or portion thereof associated with the identifier, the Media Content Detection Application 12 can process the Identifying Information or portion thereof and add the processed output to the Identifying Information or portion thereof that it provides to the Voice Assistant 14 or one or more Voice Assistant Subsystems 15.

As discussed above, the detected Identifying Information or portion thereof of a media content program can be provided to a Voice Assistant 14 or one or more subsystems 15 of a Voice Assistant 14. Amazon Alexa or Google Assistant are examples of a Voice Assistant 14. A Voice Assistant 14 is sometimes called a voice service, a virtual assistant service, or a voice assistant service. A Voice Assistant 14 is composed of one or more subsystems (Voice Assistant Subsystems 15), and a Voice Assistant 14 or its Voice Assistant Subsystems 15 can be in a device (such as a mobile phone, a smart speaker, a streaming media box, a set top box, or a television) or in the Cloud 19 or a combination of both. A Voice Assistant Subsystem 15 can be a voice app in the Voice Assistant 14. A Skill in Amazon's Alexa voice assistant or an Action in Google's Google Assistant voice assistant are examples of voice apps.

Other Voice Assistant Subsystems 15 can be a speaker, a microphone, an Audio Speech Recognition (ASR) system, a Natural Language Understanding (NLU) system, or the like. Access to a Voice Assistant 14 is typically through a device (called a Voice Assistant Device 18, examples of which are a smart speaker, a television, or a mobile phone) that implements the Voice Assistant and some of the Voice Assistant Subsystems 15 while accessing other Voice Assistant Subsystems 15 in the Cloud 19.

The Voice Assistant Device 18 can take many forms. For example, a Voice Assistant Device 18 can be a device that is separate from the device that is doing the media content program playout (i.e., the Media Content Player 10 or separate device), the same device that is doing the media content program playout, a device whose primary function is the implementation of a Voice Assistant 14, a device whose primary function is something other than the implementation of a Voice Assistant 14, or the like. For example, a Voice Assistant Device 18 can be a smart speaker, a mobile phone, a tablet, a television, a car audio or navigation system, headphones, a laptop computer, a set top box, a remote control, or a home audio system.

The Media Content Detection Application 12 may be implemented in the Voice Assistant Device 18 or in a device separate from the Voice Assistant Device 18. The Media Content Detection Application 12 may also be a Voice Assistant Subsystem 15.

If the Media Content Detection Application 12 is in a device separate from the Voice Assistant Device 18, then it is assumed that the devices are in the same room, are in adjacent rooms, or are in close proximity to each other. Alternatively, the devices may be located remote from each other and in wired or wireless communication with each other.

After the Media Content Detection Application 12 detects the identity of the program, looks up the detected identifier in the Identifier Database 16, and retrieves the Identifying Information or portion thereof, it conveys the Identifying Information or portion thereof of the program to the Voice Assistant 14 or to one or more Voice Assistant Subsystems 15 (for example a voice app or NLU) either directly to the Voice Assistant 14 or Voice Assistant Subsystems 15 or through the Voice Assistant Device 18 to the Voice Assistant 14 or Voice Assistant Subsystems 15.

A multitude of methods can be used to convey the Identifying Information or portion thereof of the program from the Media Content Detection Application 12 to the Voice Assistant 14 or Voice Assistant Subsystems 15. For example, the Identifying Information or portion thereof can be conveyed through an API 20 in the Voice Assistant 14.

The Media Content Detection Application 12 can convey the Identifying Information or portion thereof of a program to the Voice Assistant 14 or Voice Assistant Subsystems 15 before, after, during, independent of, or in response to a user voice command to the Voice Assistant 14. Or, the Media Content Detection Application 12 can convey the Identifying Information or portion thereof of a program to the Voice Assistant 14 or Voice Assistant Subsystems 15 at a predetermined time, at predetermined and/or programmable intervals, at any time, or as many times as it determines necessary depending on context or predefined rules, whether in a single event or multiple continuous events.

The Voice Assistant 14 or Voice Assistant Subsystems 15 use the Identifying Information or portion thereof of the program received from the Media Content Detection Application 12 to initiate actions or when processing a user's voice command. A user's voice command is received by the Voice Assistant 14, typically through the Voice Assistant Device 18, and processed by one or more Voice Assistant Subsystems 15. Types of processing of the user's voice command based on the Identifying Information or portion thereof of the program include but are not limited to interpreting the user's voice command, determining the intent of the user's voice command, determining what actions to take upon receipt or interpretation of the user's voice command, launching another Voice Assistant Subsystem 15 such as a voice app, formulating the response or responses to the user's voice command, or determining what form or forms the response should take. The Voice Assistant 14 or Voice Assistant Subsystems 15 can also use and process the Identifying Information or portion thereof of the program received from the Media Content Detection Application 12 and initiate actions or processes at any time whether or not a user 9 has spoken a voice command.

When the Voice Assistant 14 or Voice Assistant Subsystems 15 receive both a user's voice command and Identifying Information or portion thereof of a program from the Media Content Detection Application 12, the Voice Assistant 14 or Voice Assistant Subsystems 15 use the Identifying Information or portion thereof when processing the voice command from the user 9.

The Voice Assistant 14 or Voice Assistant Subsystems 15 can receive the user's voice command and can receive the Identifying Information or portion thereof of a program (which may include a whole video or audio program or portions of a video or audio program) at any time, any number of times, and in any order with any amount of time between reception of the user's voice command and reception of the Identifying Information or portion thereof.

In an example embodiment, a user speaks a voice command while a program is being decoded or played out by the Media Content Player 10 and being listened to or viewed by the user 9. The Media Content Detection Application 12 detects the identity of the program, looks up the identifier in the Identifier Database 16, retrieves the Identifying Information or portion thereof, and conveys the Identifying Information or portion thereof to the Voice Assistant 14 or Voice Assistant Subsystems 15. The Voice Assistant 14 or Voice Assistant Subsystems 15 receive the user's voice command and the Identifying Information or portion thereof at any time and in any order.

The Media Content Detection Application 12 can detect the identity of a program at any time and independent of whether or not a user speaks a voice command.

The user's voice command can also cause the Voice Assistant 14 or Voice Assistant Subsystems 15 to request the Media Content Detection Application 12 to detect the identity of a program and convey the Identifying Information or portion thereof of the program to the Voice Assistant 14 or Voice Assistant Subsystems 15.

A Voice Assistant 14 or Voice Assistant Subsystems 15 can also use prior-received Identifying Information or portion thereof of a program when processing follow-on or subsequent voice commands from a user 9 or a series of voice commands from a user 9.

When a user 9 speaks a command to a Voice Assistant 14, the Voice Assistant 14, among other things, converts the audio of the user's voice command to a text string using a Voice Assistant Subsystem 15. This subsystem 15 is sometimes referred as Audio Speech Recognition (ASR).

The text string is then sent to another Voice Assistant Subsystem 15 to determine the intent of the user 9 and determine which voice app should process the user's voice command. This subsystem 15 is sometimes referred as Natural Language Understanding (NLU). The Voice Assistant 14, Voice Assistant Subsystems 15 (for example a voice app or the NLU of the Voice Assistant), or the Contextual Voice Interaction Service 22 can use the Identifying Information or portion thereof of a program when processing a user's voice command in many ways. For example, the Voice Assistant 14 or one or more Voice Assistant Subsystems 15 could use the Identifying Information or portion thereof of a program to interpret intent, determine and take actions, or formulate responses.

The Voice Assistant 14, Voice Assistant Subsystems 15, or the Contextual Voice Interaction Service 22 can also use or process the Identifying Information or portion thereof of a program and take actions independent of a user's voice command and/or without having received and/or having processed a user's voice command. For example, the Voice Assistant 14 or one or more Voice Assistant Subsystems 15 could use the Identifying Information or portion thereof of a program to interpret intent, determine and take actions, or formulate responses without a user 9 having spoken a voice command. For example, the Voice Assistant 14 may launch an app relating to the program or ad in anticipation of a possible voice command from a user.

The Identifying Information or portion thereof can be used or processed by the Voice Assistant 14, the Contextual Voice Interaction Service 22, and any number of Voice Assistant Subsystems 15 as many times as needed, in any order, and at any time.

Examples of use and processing of Identifying Information or portion thereof by the Voice Assistant 14, Voice Assistant Subsystems 15, or the Contextual Voice Interaction Service 22 include but are not limited to: interpret the intent of the user's voice command; determine what actions to take for the user 9; launch a Voice Assistant Subsystem 15; install a voice app for the user 9; launch a voice app; determine which voice app or Voice Assistant Subsystem 15 to launch or install; determine which voice app or Voice Assistant Subsystem 15 to forward the user's voice command to; determine which part of a voice app or Voice Assistant Subsystem 15 to execute; execute a certain part of a voice app or Voice Assistant Subsystem 15; discover voice apps in the Voice Assistant 14; enable simplified word phrasing and syntax of a command that the user 9 needs to say in order to perform a desired function; enable understanding of a reduced the number of words in a command that the user 9 needs to say in order to perform a desired function; perform a search related to the user's voice command or to the Identifying Information or portion thereof of a program; retrieve additional information related to the program or portion of a program from an external service and use that information in subsequent processing; retrieve a set or sets of instructions related to the program from a service, such as the Contextual Voice Interaction Service 22, and use those instructions in subsequent processing; work with the Contextual Voice Interaction Service 22 for subsequent processing; formulate a response to the user's voice command by, for example, determining the words of an audio response, the text of an SMS message to the user's mobile phone, a graphic that will appear on a user's tablet; determine and formulate the form of the response where the response can take a singular form or multiple forms including audio, video, text, graphics, or any combination of these; choose the device or devices through which the user 9 will receive one or more responses (for example, the devices may comprise the Voice Assistant Device 18 such as a smart speaker, a mobile phone, a television, a home audio system, an automobile audio or navigation system, a tablet, or any other electronic device); fulfill an action specified by a voice app or by the retrieved set or sets of instructions related to the program or portion of a program; or the like.

A device, system, or service that is external to the Voice Assistant 14 or Voice Assistant Device 18 can also use the Identifying Information or portion thereof of a program to perform its own processing.

When processing a user's voice command or processing Identifying Information or portion thereof, the Voice Assistant 14 or one or more Voice Assistant Subsystems 15 can access a service called the Contextual Voice Interaction Service 22. The Contextual Voice Interaction Service 22 contains a number of Contextual Voice Interaction Instruction Packages 23, where each package contains a set of logical instructions that can be executed by the Voice Assistant 14 or one or more Voice Assistant Subsystems 15 when processing Identifying Information or portion thereof or processing a user's voice command and any follow-on or subsequent user voice commands.

A Contextual Voice Interaction Instruction Package 23 is associated with the identity of a media content program. When interfacing with the Contextual Voice Interaction Service 22, the Voice Assistant 14 or the Voice Assistant Subsystems 15 convey the Identifying Information or portion thereof of a program to the Contextual Voice Interaction Service 22, which uses the Identifying Information or portion thereof to look up, choose, and gain access to one or more Contextual Voice Interaction Instruction Packages 23. The Contextual Voice Interaction Service 22, the Voice Assistant 14, or Voice Assistant Subsystems 15 can perform this process multiple times during a program to create, for example, an interactive experience between a Media Content Player 10 (such as a television), a Voice Assistant 14 or Voice Assistant Device 18 (such as a smart speaker), and a user 9.

Upon access to a Contextual Voice Interaction Instruction Package 23, the Voice Assistant 14 or Voice Assistant Subsystems 15 execute and follow the set of instructions in the Contextual Voice Interaction Instruction Package 23 when processing Identifying Information or portion thereof or processing the user's voice command or follow-on or subsequent user voice commands.

The Voice Assistant 14 or Voice Assistant Subsystems 15 can also use the information contained in the Contextual Voice Interaction Instruction Package 23 to carry out any other processing relating to the Media Content 5 or the voice commands.

A Contextual Voice Interaction Instruction Package 23 may describe, for example, a back and forth dialog between a user 9 and the Voice Assistant 14 where a user 9 speaks a series of voice commands and the Contextual Voice Interaction Service 22 or the Voice Assistant 14 or Voice Assistant Subsystems 15 can use the Contextual Voice Interaction Instruction Package 23 to form responses to the user's voice commands. Either the user or the Voice Assistant 14 can initiate a dialog.

The Contextual Voice Interaction Service 22 or a Contextual Voice Interaction Instruction Package 23 can use the Identifying Information or portion thereof for a program to also process the user voice commands. The Contextual Voice Interaction Instruction Package 23 may specify, for example, a set of instructions to be followed when interacting with a user 9, ways to initiate an interaction with a user 9, how to process user voice commands, how to respond to user voice commands, ways to interpret user voice commands, responses for the initial voice command and for any follow-on or subsequent voice commands, form of response and device through which the response will be delivered to the user 9, any actions to take for the initial voice command and for any follow-on or subsequent voice commands, initiate and complete any fulfillment instructions, or the like.

An identity of a program may be associated with one or more Contextual Voice Interaction Instruction Packages 23 and which package to be used can be based on any of a number of attributes or conditions. For example, which package to be used can be based on time, day, date, location, user id, device id, prior interaction with a user 9 by the Voice Assistant 14, and the like.

New Contextual Voice Interaction Instruction Packages 23 can be created or updated and activated and made available through the Contextual Voice Interaction Service 22 at any time. The Contextual Voice Interaction Service 22 can also create the Identifier Database 16 and create the Identifying Information to be added to the Identifier Database 16.

The Contextual Voice Interaction Service 22 provides a user interface for the creation of Contextual Voice Interaction Instruction Packages 23, for the association of the identity of a program or class of programs to a package, and for the creation of the Identifier Database 16.

The Contextual Voice Interaction Service 22, the Voice Assistant 14, or Voice Assistant Subsystems 15 can interface with a Contextual Voice Interaction Fulfillment Service 24 when executing a Contextual Voice Interaction Instruction Package 23.

If the execution of a Contextual Voice Interaction Instruction Package 23 or the execution of a Voice Assistant Subsystem 15 (such as a voice app) includes an action that is dependent on an external service to fulfill an action, then the Contextual Voice Interaction Service 22, the Voice Assistant 14, or Voice Assistant Subsystems 15 interface with the Contextual Voice Interaction Fulfillment Service 24 to complete that action. The Contextual Voice Interaction Fulfillment Service 24 interfaces to an external service 26, such as coupon or payment service, to initiate and complete the action.

Examples of actions in a Contextual Voice Interaction Instruction Package 23 or in a Voice Assistant Subsystem 15 (such as a voice app) needing a fulfillment service include but are not limited to: sending a URL to the user 9; sending a coupon to the user 9 for a product or service; ordering a product or service; adding an item to a shopping cart; executing the purchase of a product or service; providing a promotional discount for a product or service; sending more information about a product or service; offering or completing a subscription signup to a product or service; offering or completing a membership signup to a product or service or organization delivering a product to the user 9; sending an SMS or text message to the user 9, or the like.

In a further example embodiment of an automated method for improving engagement with a Voice Assistant 14 or smart speaker, the Voice Assistant 14 may be enabled to carry out instructions without first receiving a voice command. Media content playback may be monitored at a Media Content Player 10. The Media Content 5 may be identified via a Media Content Detection Application 12. Instructions relating to the identified media content may be located via the Media Content Detection Application 12. The located instructions may then be provided to the Voice Assistant 14 or one or more of the Voice Assistant Subsystems 15. The actions are then carried out in accordance with the located instructions by the Voice Assistant 14 or the Voice Assistant Subsystem(s) 15. The foregoing takes place without first receiving a voice command. Subsequent to the carrying out of the actions, voice commands may be issued and carried out. Other features and functionality described above may also be implemented in such an embodiment.

It should now be appreciated that the present invention provides advantageous methods and apparatus for improving interaction and engagement with voice assistants and smart speakers.

Although the invention has been described in connection with various illustrated embodiments, numerous modifications and adaptations may be made thereto without departing from the spirit and scope of the invention as set forth in the claims.

What is claimed is:

1. An automated method for improving engagement with a voice assistant or smart speaker, comprising:
   detecting media content playback at a media content detection application;

detecting an identifier within the media content via the media content detection application;

identifying the media content, comprising locating the detected identifier in an identifier database and retrieving associated identifying information for the media content;

receiving a voice command from a user at a voice assistant relating to the identified media content;

providing a contextual voice interaction service in communication with the voice assistant for:
  determining context of the voice command in relation to the identified media content;
  processing the voice command based on the determined context; and
  communicating with the user;

executing the voice command based on the determined context;

wherein:
  the identifying information is provided to the voice assistant or one or more voice assistant subsystems for use in at least one of the determining of the context of the voice command and the processing of the voice command; and
  the contextual voice interaction service comprises a plurality of contextual voice interaction instruction packages, each of the instruction packages being associated with corresponding media content via the identifying information for the corresponding media content and containing instructions for responding to possible voice commands and/or follow-on voice commands related to the corresponding media content.

2. The automated method in accordance with claim 1, wherein the identifying information is provided to the voice assistant and/or to the one or more voice assistant subsystems at least one of before the receiving of the voice command, subsequent to the receiving of the voice command, and at multiple times either before or after the receiving of the voice command.

3. The automated method in accordance with claim 1, wherein the media content detection application processes the identifying information and adds the processed output to the identifying information or a portion of the identifying information that is provided to the voice assistant or the one or more voice assistant subsystems.

4. The automated method in accordance with claim 1, wherein the identifier comprises one of a string of characters embedded in the media content, a watermark embedded in the media content, or a fingerprint of the media content.

5. The automated method in accordance with claim 1, wherein an Ad-ID system can be used for creating the identifier for advertisements, and an EIDR system can be used for creating the identifier for video programs.

6. The automated method in accordance with claim 1, wherein the identifying information comprises at least one of: a title or identity of the media content; a unique identifier for the media content; a description of the media content; a transmission channel or source of the media content; metadata for the media content; instructions or information associated with the media content required by the media content detection application or the voice assistant for carrying out associated functions related to the media content or the voice command; and programs or applications related to the media content.

7. The automated method in accordance with claim 1, wherein at least one of the voice assistant, the media content detection application, and the contextual voice interaction service is one of hardware-based, cloud-based, or both hardware and cloud-based.

8. The automated method in accordance with claim 1, wherein the contextual voice interaction service is enabled to at least one of create and populate an identifier database which associates the identifier with identifying information for the media content.

9. The automated method in accordance with claim 1, wherein:
  at least one of the voice assistant, the one or more voice assistant subsystems or the contextual voice interaction service is enabled to take actions without first receiving the voice command or to take actions that are independent of the voice command; and
  the actions comprise at least one of interpreting intent of possible voice commands, formulating responses prior to receiving a possible voice command, and launching an application relating to the media content in anticipation of a possible voice command.

10. The automated method in accordance with claim 1, wherein the identifying information is used or processed by at least one of the voice assistant, the contextual voice interaction service, or the one or more voice assistant subsystems to at least one of: interpret an intent of the voice command; determine what actions to take in response to the voice command; launch one of the one or more voice assistant subsystems; determine which voice application or voice assistant subsystem to install or launch; install a voice application related to the media content; launch a voice application related to the media content; determine which voice application or voice assistant subsystem to forward the voice command to; determine which part of a voice application or voice assistant subsystem to execute; execute a certain part of a voice application or voice assistant subsystem; discover voice applications in the voice assistant; enable simplified word phrasing and syntax of the voice command needed to perform a desired function; enable understanding of a reduced number of words in the voice command needed in order to perform a desired function; perform a search related to the voice command or to the identifying information or portion thereof; retrieve additional information related to the media content from an external service and use the additional information in subsequent processing; retrieve instructions related to the media content and use the instructions in subsequent processing; formulate a response to the voice command by determining words of an audio response, the text of an SMS message to a user's mobile phone, or a graphic that will appear on a user's electronic device; determine and formulate a form of a response to the voice command including at least one of audio, video, text, or graphics; determine one or more devices through which the user will receive one or more responses to the voice command; fulfill an action specified by a voice application or by the retrieved instructions related to the media content.

11. The automated method in accordance with claim 10, wherein the one or more devices comprise a smart speaker, a mobile phone, a smart television, a home audio system, an automobile audio or navigation system, a tablet computer, and an internet enabled device.

12. The automated method in accordance with claim 1, further comprising at least one of adding additional instruction packages to the contextual voice interaction service or updating the instruction packages.

13. The automated method in accordance with claim 1, further comprising providing a contextual voice interaction fulfillment service associated with at least one of the voice assistant and the contextual voice interaction service enabled to fulfill any action requested as a result of processing the voice command.

14. The automated method in accordance with claim 13, wherein the fulfillment service is in communication with external services for the fulfillment of the requested action.

15. The automated method in accordance with claim 1, wherein the detecting of the identifier is carried out using one of an automated content recognition (ACR) application or audio watermarking.

16. The automated method in accordance with claim 1, wherein the media content comprises at least one of an audio or video program, a portion of an audio or video program, an audio or video advertisement, or a portion of an audio or video advertisement.

17. The automated method in accordance with claim 1, wherein:
the media content is provided by a media content playback device; and
the media content playback device comprises a standalone device, a television, a smart TV, a radio, a streaming media device, a digital assistant device, a set top box, a speaker, a smart speaker, a mobile phone, a tablet, a laptop computer, a home audio system, headphones or earphones with an associated microphone, or electronic signage.

18. The automated method in accordance with claim 1, wherein the media content detection application and the voice assistant are integrated in a single device.

19. The automated method in accordance with claim 1, wherein the identifying of the media content occurs one of prior to the receiving of the voice command or upon receipt of the voice command.

20. The automated method in accordance with claim 1, wherein the voice command comprises one of a verbal request for action, a statement, a question, or a response to the voice assistant.

21. An automated system for improving engagement with a voice assistant or smart speaker, comprising:
a media content playback device for playback of media content;
a media content detection application for detecting media content playback;
the media content detection application is adapted for identifying the media content by detecting an identifier within the media content, locating the detected identifier in an identifier database, and retrieving associated identifying information for the media content;
a voice assistant for receiving a voice command from a user relating to the identified media content; and
a contextual voice interaction service for determining a context of the voice command in relation to the identified media content;
wherein:
the identifying information is provided to the voice assistant or one or more voice assistant subsystems for use in at least one of the determining of the context of the voice command and processing of the voice command;
the voice assistant processes and executes the voice command based on the determined context; and
the contextual voice interaction service comprises a plurality of contextual voice interaction instruction packages, each of the instruction packages being associated with corresponding media content via the identifying information for the corresponding media content and containing instructions for responding to possible voice commands and/or follow-on voice commands related to the corresponding media content.

* * * * *